March 20, 1962 P. K. WEIMER 3,026,416

PHOTOCONDUCTIVE DEVICES

Filed July 23, 1957 5 Sheets-Sheet 1

INVENTOR.
PAUL K. WEIMER

BY
William A. Zalesak
ATTORNEY

INVENTOR.
PAUL K. WEIMER
BY
William A. Zalesak
ATTORNEY

INVENTOR.
PAUL K. WEIMER
BY
William A. Zalesak
ATTORNEY

March 20, 1962 P. K. WEIMER 3,026,416

PHOTOCONDUCTIVE DEVICES

Filed July 23, 1957 5 Sheets-Sheet 4

INVENTOR.
PAUL K. WEIMER

BY

William A. Zalesak
ATTORNEY

March 20, 1962 P. K. WEIMER 3,026,416

PHOTOCONDUCTIVE DEVICES

Filed July 23, 1957 5 Sheets-Sheet 5

INVENTOR.
PAUL K. WEIMER

BY William A. Zalesak

ATTORNEY

United States Patent Office 3,026,416

Patented Mar. 20, 1962

3,026,416
PHOTOCONDUCTIVE DEVICES

Paul K. Weimer, Princeton, N.J., assignor to Radio Corporation of America, a corporation of Delaware Filed July 23, 1957, Ser. No. 673,697
17 Claims. (Cl. 250—211)

This invention relates to photoconductive devices. In particular, this invention relates to a means for decreasing the effective lag in a photoconductive type of device.

As is well known, a photoconductor is a material which has a relatively high resistance when in the dark, and which has a relatively high conductivity when exposed to radiations such as light, infra-red rays, X-rays etc. Photoconductive lag is either the delay which is encountered between the time the radiations are directed onto the photoconductor and the time when the photoconductor attains the high conductivity state, or the delay between the time the radiations are removed from the photoconductor and the time when the photoconductor returns to its original high resistance state.

When the radiations are first directed onto a photoconductor, the resistance of the photoconductor usually decreases very rapidly at first. This portion of the photoconductive response is referred to as a fast component. After the initial fast component, the resistance of the photoconductor decreases rather gradually until a minimum resistance is attained. This gradual decrease in resistance is referred to as a slow component. When the light is removed, the photoconductor also goes through an initial fast component and then a slow component in a manner similar to that described.

Another type of lag which is found in some photoconductive structures is capacitive lag. Capacitive lag is the lag caused by the capacitance across the photoconductor and is determined by the R.C. time constant of the photoconductor in its associated circuit.

Photoconductors have been used prior to this invention in various types of devices such as photocells, pickup tubes, and electroluminescent devices. In all of these devices, one of the restrictions upon the particular photoconductive material selected is that the lag characteristic of the particular material should meet certain standards. As an example, in a photoconductive type pickup tube, the photoconductive material should have a resistivity which will reach a stabilized value within 1/30 of a second after the light intensity is changed for the photoconductor to be suitable for use with the presently used television scanning rates. There are many known photoconductive materials which have relatively high sensitivities, but which have a lag characteristic which exceeds 1/30 of a second. Therefore, these known photoconductive materials cannot be used in the pickup devices of this type due to the fact that their lag characteristic would tend to carry scenes over from one frame to another, when used with standard television scanning rates, resulting in a blurred output signal. The other types of photoconductive devices mentioned above also have fairly strict requirements as to the amount of photoconductive lag which can be tolerated for their particular use.

It is therefore an object of this invention to provide a new and improved photoconductive device.

It is another object of this invention to provide a novel means for decreasing the effective lag in a photoconductive system.

It is a further object of this invention to provide an improved photoconductive tube or system in which photoconductive material having normally excessive lag can be utilized.

These and other objects are accomplished in accordance with this invention by providing a first photoconductive means and a second photoconductive means, having a transient response that is different from that of the first photoconductive means, both of which are actuated by substantially the same radiations from a scene, and combining the output information from both the first and the second photoconductive means in such a manner that the lag characteristic of the combination is substantially faster than that of either the first or the second photoconductive means when considered alone. The information may be combined by subtraction or by addition of the output signals. This procedure is called lag compensation.

This invention will be more clearly understood by reference to the following description when read in connection with the accompanying five sheets of drawings wherein.

Figure 1:
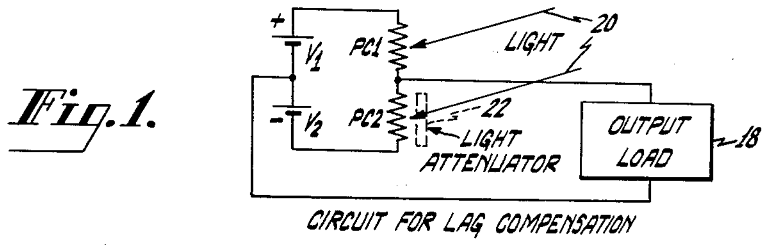
FIG. 1 is a diagram of a circuit which is suitable for lag compensation by the subtraction method in accordance with the invention.

Referring now to the drawings in detail and particularly to FIG. 1, there is shown an equivalent circuit diagram for lag compensation by subtraction in a photoconductive device in accordance with this invention. The circuit comprises a main photoconductor PC1 and a compensating photoconductor PC2 connected together in series across two potential sources $V_1$ and $V_2$. Connected from a point between the potential sources $V_1$ and $V_2$ and to a point between the photoconductors PC1 and PC2, is an output load 18. The potential sources $V_1$ and $V_2$ may take any conventional form and are illustrated as batteries for simplicity of illustration.

The photoconductors PC1 and PC2 are schematically shown to represent the photoconductor in a pickup tube, a photoconductive cell or a light amplifier. The photoconductors are arranged to be struck simultaneously by light from a scene as indicated by arrows 20. The compensating photoconductor PC2 may be partially shielded from the light by a light attenuator, or filter 22. The purpose of shielding the compensating photoconductor is to provide a transient response in the compensating photoconductor PC2 that is different from the transient response in the main photoconductor PC1. Other means for producing a transient response in one photoconductor that is different from that in the other photoconductor will be described hereinafter.

When no light is on the photoconductors PC1 and PC2, both of the photoconductors have a high resistance and therefore the current through the output load is substantially zero.

Figure 2:
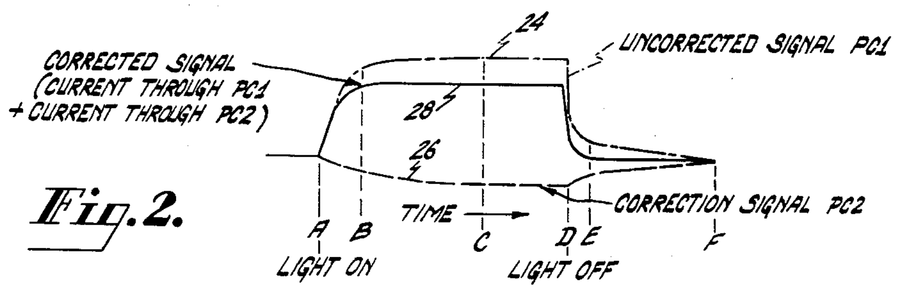
FIG. 2 is an output voltage curve illustrating the principles of the subtraction method of combining output voltages in accordance with this invention.

Referring now to FIGS. 1 and 2 for the conditions existing when the light 20 first strikes the photoconductors, the current through photoconductor PC1 (curve 24) builds up rather sharply for a short period of time through region A—B, i.e. the fast component of the response, then gradually increases, i.e. the slow component, during region B—C until it eventually levels off as is illustrated by region C—D of the curve 24 in FIG. 2. When the light is turned off, the current in photoconductor PC1 decreases sharply, i.e. the fast component of the response, through region D—E, then gradually decreases until it reaches zero at point F. During the same interval of time, the current in the compensating photoconductor PC2 (curve 26) goes through approximately the same cycle. However, due to the circuit connections of the circuit shown in FIG. 1, the current through the photoconductor PC2 is inverted in polarity. Due to the light filter 22, or to other arrangements as will be explained, the magnitude of the current flow through the compensating photoconductor PC2 (curve 26) is relatively small as compared to the magnitude of the current flow in the main photoconductor PC1 and lacks the rapid rise and rapid decay of the photoconductor PC1 during the initial period when the light is first turned on or off. As can be seen from FIG. 2, the current flow in the compensating photoconductor PC2 gradually increases, in a negative direction, once the light is turned on and through region A—C, and then is substantially flat. When the light is turned off, the current in the compensating photoconductor gradually decreases to eventually reach zero at point F.

The relative sensitivities and/or the relative lags of the main photoconductor PC1 and its compensating photoconductor PC2 can be adjusted by one or more of the following means:

(1) The use of different photoconductive materials e.g. antimony tri-sulphide and amorphous selenium, or by the use of different processing methods, e.g. thick and thin deposits, applied to the same material for the two photoconductors PC1 and PC2;

(2) The use of different applied voltages for the voltage sources $V_1$ and $V_2$; if alternating current drive is being used, the relative phases of $V_1$ and $V_2$ can be adjusted in addition;

(3) The use of a semi-transparent light absorber, e.g. filter 22 in FIG. 1, in front of the compensating photoconductor PC2. A light absorber will force the compensating photoconductor PC2 to operate at a lower light level than the main photoconductor PC1 and thus make the compensating photoconductor PC2 relatively more laggy and less sensitive than the main photoconductor PC1; and, (4) The use of a bias light (not shown) directed onto the photoconductors PC1 or PC2, or both. The bias light may be, for example, a visible, infra-red or ultra violet light.

By properly combining the current in the main photoconductor PC1 and the current in the compensating photoconductor PC2, the composite output current may be greatly improved with respect to its lag characteristic. This is illustrated by the lag compensated curve 28 in FIG. 2 which illustrates the combination, by subtraction, of the currents flowing in the photoconductors PC1 and PC2. As can be seen from FIG. 2, the compensated current flow rapidly increases between points A and B. From point B, the compensated current is substantially flat for the balance of the time during which the light is on. When the light is turned off, at point D, the compensated current promptly decreases until it is almost immediately at zero at point E. Thus, the combined currents of the main photoconductor PC1 and the compensating photoconductor PC2 has a better lag characteristic than the lag characteristic of either of the photoconductors when considered alone. This improvement occurs in both the build-up and the delay lag characteristics. In other words, the current flow in the photoconductor PC1 increases somewhat between the points B and C, while the compensated photoconductor current is substantially flat in this area. Also, the current in the compensated curve decreases to zero almost immediately when the light is removed while the individual photoconductive currents tend to trail off to point F.

As shown in FIG. 2, when the subtraction process of lag compensation is used, the corrected or lag compensated signal, curve 28, is decreased somewhat in magnitude. Thus, the signal that is lag corrected by the subtraction process has a somewhat smaller signal to noise ratio than that of the uncorrected signal. However, the benefits of lag correction more than offset any disadvantage resulting from the slight decrease in signal to noise ratio.

Figure 3:
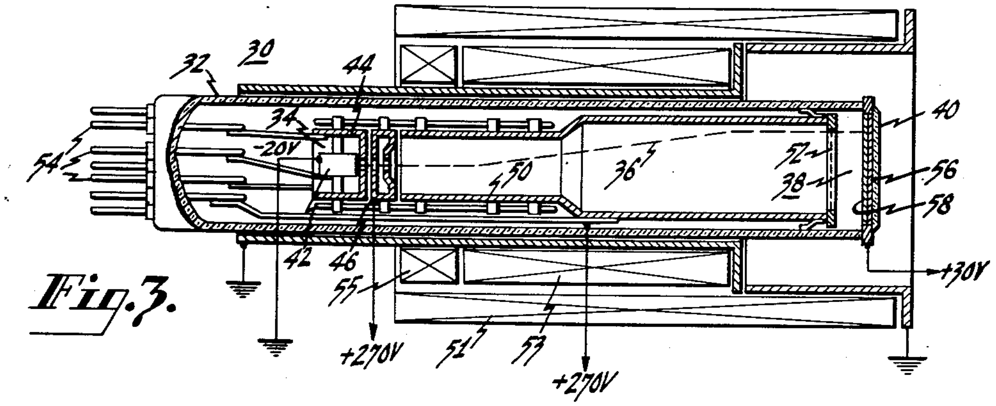
FIG. 3 is a transverse sectional view of a pickup tube for use with this invention.

Referring now to FIG. 3, there is illustrated a transverse sectional view of a pickup tube 30 for use with this invention. The pickup tube illustrated is a conventional tube, which will be described hereinafter in various systems, and which will be described as including various structures, both of which are in accordance with this invention.

The pickup tube 30 comprises an evacuated envelope 32 having an electron gun 34 in one end thereof for producing an electron beam 36. The electron beam 36 is directed toward a target electrode 38, in the other end of the envelope 32. The target 38 is supported upon a faceplate 40 that closes the end of envelope 32. The electron gun 34 may be of any conventional form and includes a cathode 42, a control electrode 44, an accelerating electrode 46 and a final accelerating electrode 50 that is closed at the target end by a fine mesh screen 52 closely spaced from the target 38. The electrodes are supported in any conventional manner and are energized by lead-ins 54 which extend through the end of the envelope 32. The target electrode 38 comprises a transparent conductor, or signal plate 56, having a deposit of photoconductive material 58 thereon. The transparent conductor 56 may be a material such as tin chloride or tin oxide. The photoconductive material 58 may be any known photoconductive material such as antimony trisulphide or antimony oxy-sulphide. Surrounding the envelope 32 is a conventional focusing coil 51, a deflection yoke 53 and an alignment coil 55.

During operation of the tube 30, with potentials such as those shown in FIG. 1 as an example applied to the tube 30, the electron beam 36 scans over the exposed surface of the photoconductor 58 and establishes a charge or equilibrium potential thereon. When light from a scene or image to be reproduced is directed onto the photoconductor 58, the photoconductor 58 becomes conductive in the areas struck by the light and the charge on the scanned surface of these areas of the photoconductor 58 is conducted to the signal plate 56. The discharging of charged portions of the photoconductor is of an amount that is proportional to the amount of light from the image that strikes the photoconductor in those areas. When the beam re-scans a discharged area of the photoconductor, the beam replaces the charge on the scanned surface of the photoconductor and, by means of the capacity coupling between the scanned surface of the photoconductor and the signal plate, produces an output signal on the signal plate in proportion to the amount of charge that is replaced. The output signals produced in the signal plate 56 are then fed into conventional amplifier circuits to be transmitted.

Figure 4:
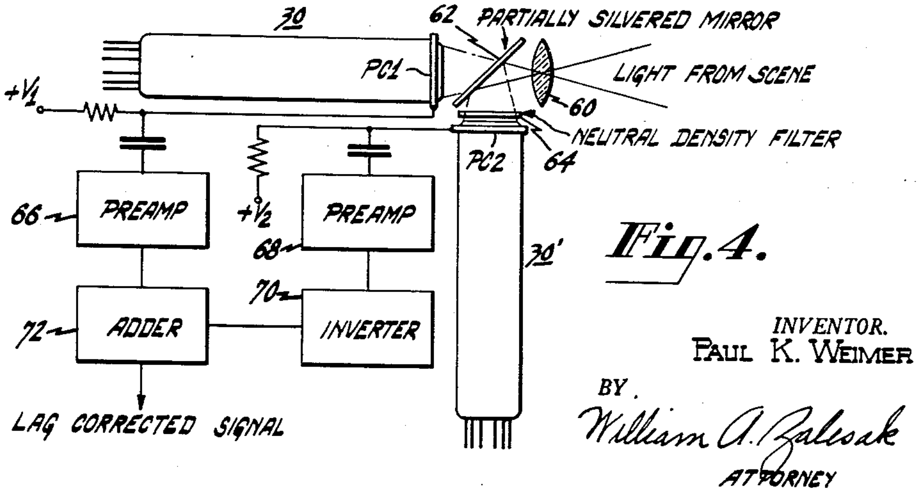
FIGS. 4 through 9 are diagrammatic views of pickup tube structures and systems in accordance with this invention.

Referring now to FIG. 4, there is shown a system of lag compensation, by means of subtraction, in accordance with this invention. This figure is a diagrammatic view of two standard pickup or camera tubes 30 and 30' in a monochrome two tube camera system to provide lag compensation of the output signal. The tubes 30 and 30' are both the equivalent of the tube shown in FIG. 3. The system includes a lens 60 which directs light from a scene or image onto a partially silvered mirror 62. A portion of the light passes through the mirror 62 to strike the main photoconductor PC1 in the tube 30. The balance of the light is reflected by the mirror 62 to pass through a light filter to strike the compensating photoconductor PC2 in the tube 30'. The light from the scene striking the main photoconductor in the tube 30 produces a signal such as curve 24 shown in FIG. 2; while the light from the scene striking the photoconductor in tube 30' produces a signal similar to curve 26 in FIG. 2. The amplitude of the signal produced in tube 30' is small because of the fact that more of the light from the scene is passed toward tube 30 by the mirror 62 and/or the light passed toward tube 30' is partially filtered by the filter 64.

In operation of the system shown in FIG. 4, the signals from the signal plates in tubes 30 and 30' are fed through two pre-amplifiers 66 and 68, respectively. The output of pre-amplifier 68 is then inverted, by means of an inverter 70, and then added to the output of pre-amplifier 66 by means of an adder 72. The output of the adder 72 is a lag corrected or compensated signal such as curve 28 shown in FIG. 2.

The pre-amplifier 66 and 68, the inverter 70 and adder 72 may comprise any known type of circuit components which will produce the desired results of amplifying, inverting and adding. Therefore, these circuit components are shown merely as block diagrams.

During the operation of the system shown in FIG. 4, the two tubes 30 and 30' should be kept in optical and electrical registry. In other words, the two tubes should be focused on the same scene and the electron beams should scan the same portions of the two photoconductors simultaneously. Also, for lag compensation by subtraction, the decay characteristics or transient response of the two tubes should be different. In the subtraction method illustrated in FIG. 4, the signal to be subtracted, i.e. the signal on tube 30', should be relatively more laggy than the main signal. That is, the low level signal from the compensating photoconductor PC2 should be such that the low light level signal lacks the rapid initial rise and initial decay of the main signal but consists entirely of a slow rise and a slow decay of substantially the same magnitude as the slow components of the main signal. Thus, when the compensating signal is subtracted from the main signal, the slow components are cancelled out and the resultant compensated signal consists only of the fast components of the main signal from the tube 30.

There are several ways, or combination of ways, in which the different transient responses, i.e. the different lag characteristics, may be obtained in the system described. For example, one can select tubes whose targets have different lag characteristics, or, one can take two tubes with identical targets and operate one at a much lower light level than the other, resulting in a more laggy signal from the low light level tube. The tube 30' in FIG. 4 is more laggy since the light level on the tube is lower than that on tube 30 and since, in most photoconductors, the speed of response decreases as the light level is decreased. The proper balance of the light on the two tubes 30 and 30' in FIG. 4 is accomplished by choosing the proper coating on the partially silvered mirror 62 and/or by means of the neutral density filter 64 over the tube 30'.

The condition of best lag compensation by subtraction for the two photoconductors is obtained by adjusting the relative intensity of the two signals from tubes 30 and 30' before combining the signals. This adjustment can be made either by varying the target potential on the two tubes, to change their relative sensitivities, or by varying the gains of the pre-amplifier 66 and 68.

The total noise voltage in the output of the adder 72 is about 1.4 times that arising from either of the pre-amplifiers 66 and 68 alone, assuming that each is set for the same gain. The total noise can be somewhat reduced from this value by keeping the gain of correction channel, i.e. pre-amplifier 68, as small as possible. Thus, it is desirable that the correcting signal from tube 30' be as large as possible. In order to increase the correcting signal, the target voltage of the tube 30' may be raised, thereby increasing its sensitivity somewhat, since any undesirable edge flare resulting from this procedure will be attenuated in the inverter 70 before the addition of the signals. Thus, when the gain of the correction channel of the tube 30' is small, as compared to the gain of the main channel of the tube 30, the noise level increase in the composite lag compensated signal is slight.

The signal level after lag compensation is about 30 percent less than the original signal, as shown by curve 28 in FIG. 2, and so the final signal to noise ratio after compensation will be in the neighborhood of 70 percent of its original value. In general, signal to noise ratio in the type of tube under consideration is high and is not a primary factor in determining sensitivity. Instead, photoconductive lag has been the determining factor, prior to this invention, in requiring high light levels for best tube operation. By reducing the effective lag in accordance with this invention, the minimum light level for an acceptable picture is lowered, and the operating sensitivity is effectively raised.

An additional factor in the lag compensation method described in connection with FIG. 4, which results in an increased sensitivity, is that the subtraction process also tends to compensate for edge flare in the main tube thus permitting higher target voltages in both tubes. The edge flare is a condition wherein the target area has a non-uniform sensitivity varying radially from the center of the target to the edge with a higher sensitivity at the edges of the picture. Since edge flare ordinarily increases with the target voltage, a higher target potential on the compensating tube 30' introduces relatively more edge flare in the subtracted correcting signal, so that the compensated signal has less edge flare than that produced in either of the tubes 30 or 30'. The resultant increase in micro-amperes per lumen of target sensitivity produced by the higher target voltages could more than compensate for the loss of signal to noise ratio that occurs in the subtraction process.

Still further, the two tube method of lag compensation shown in FIG. 4 can be used to correct for capacitive lag in the target 38 as well as for photoconductive lag in the photoconductor 58. The system shown in FIG. 4, and the curve shown in FIG. 2, is related to a balancing of the two rise and decay curves of the proper shape and does not specify the cause of either. In other words, photoconductive lag having the proper response curve can be used to provide an approximate balance for capacitive lag or vice versa. Therefore, in some systems it may be desirable to provide a thin photoconductor in the compensating tube 30', thus producing an increased capacitive lag for the compensating processes.

Figure 5:
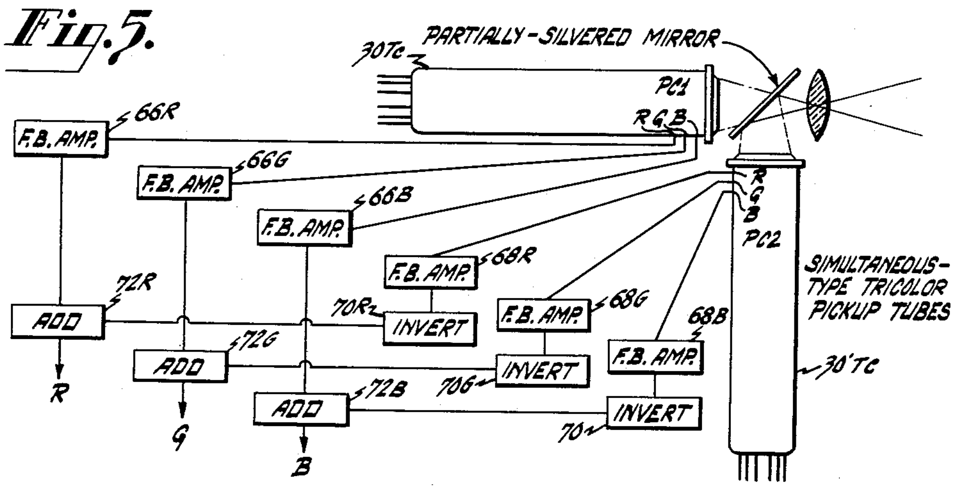

Referring now to FIG. 5, there is shown a diagrammatic view of an embodiment of this invention using two simultaneous type tri-color pickup tubes. The tubes 30TC and 30'TC are both similar to the tube shown in FIG. 3 except that the targets are constructed to produce separate signals for each of three primary colors, such as red, blue and green. Tubes of this type are known, e.g. see the U.S. Patent 2,770,746 to S. Gray. For purposes of this invention, it is a sufficient understanding of these tubes to realize that tubes of this type produce three independent signals, each of which is the signal for a different primary color of the light from an image that falls on the photoconductor of the tube. The system of this embodiment of this invention is similar to that shown in FIG. 4 except that three separate sets of circuit elements are used, each of which is for one of the three primary colors. Thus, for example, the output of adder 72R is a lag compensated for the portion of the scene that is red in color. Each of the three different color signals from the main tube 30TC is fed through a separate amplifier circuit, such as feedback amplifier 66R, into an adder, e.g. adder 72R. Each of the three different color signals from the compensating tube 30'TC is fed through a different feedback amplifier, e.g. amplifier 68R, into an inverter, e.g. inverter 70R, and then into the adder, e.g. the adder 72R.

Figures 6, 7:
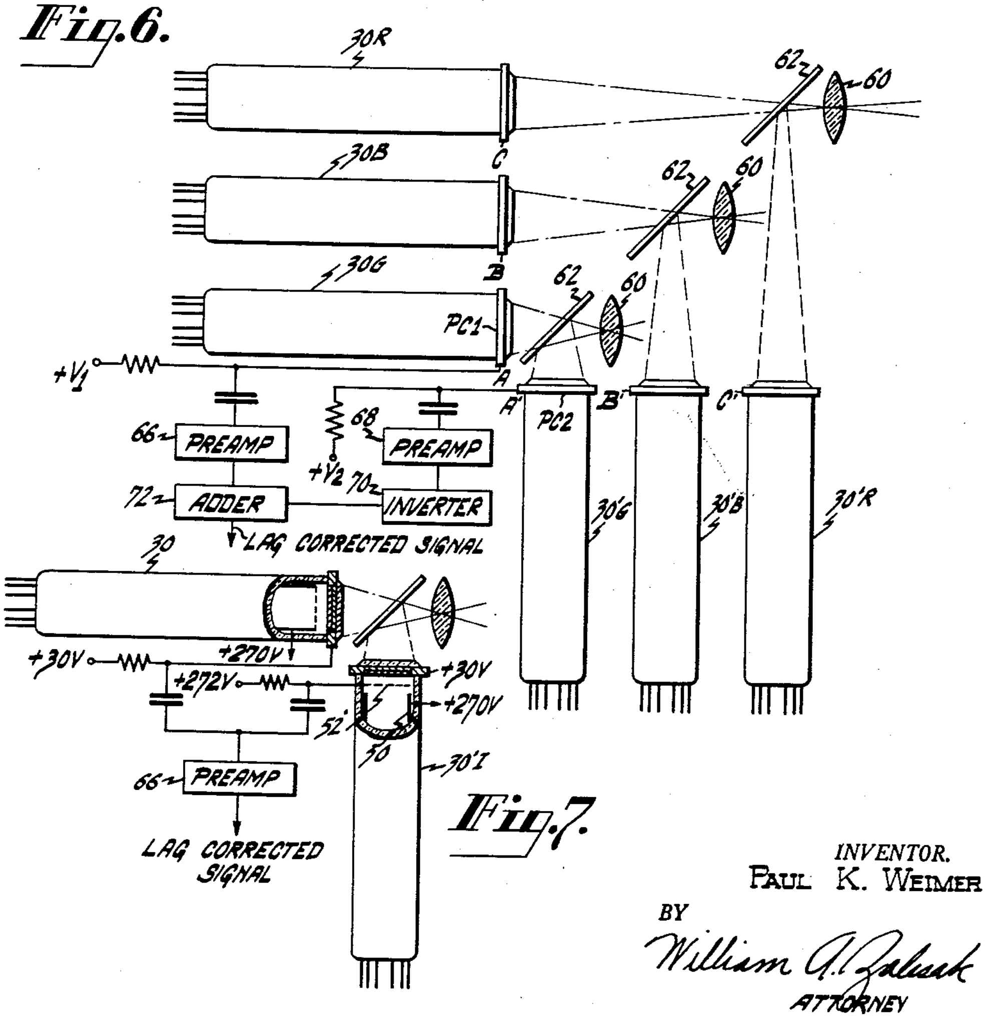

Referring now to FIG. 6, there is shown a diagrammatic view of a system for televising a tri-color lag corrected television picture using six single channel single-color pickup tubes in accordance with this invention. Each of the main signal pickup tubes 30R, 30B and 30G is sensitive to a different one of three primary colors of the light from a scene. Each of the compensating tubes 30'R, 30'B and 30'G is sensitive to the equivalent one of the three primary colors. Arranged in front of each of the lenses 60 and partially-silvered mirrors 62 is a light filter (not shown) which passes only the selected primary color of light. For example, a light filter is arranged in front of the tubes 30G and 30'G which passes only the green light.

As shown in FIG. 6, the output of the main tube 30G for the green color is fed through a pre-amplifier 66 and into an adder 72, while the output of the compensating tube 30'G for the green color is fed through a pre-amplifier 68 through an inverter 70 and into the adder 72. This system produces a compensated curve, for the green information, that is similar to the curve 28 shown in FIG. 2 and is a system that is the equivalent of the system utilized for monochrome pickup shown in FIG. 4. The circuit elements for tubes 30B and 30'B, as well as the circuit elements for tubes 30R and 30'R, are similar to those shown for tubes 30G and 30'G and are omitted from FIG. 6 for simplicity of illustration. The connections for the circuit elements (not shown) of tubes 30B and 30'B would be such that points B and B' of these tubes are connected to the points in a circuit that are the equivalent of the points A—A' of the circuit shown. Similarly, points C—C' of the tubes 30R and 30'R are connected into a circuit (not shown) at points that are the equivalent of the points A—A' of the circuit shown.

Referring now to FIG. 7, there is shown a diagrammatic view of an embodiment of this invention for monochrome pickup operation that differs from FIG. 4 by taking the correction or compensating signal from the decelerating screen, and applying this signal to a pre-amplifier, thus resulting in a lag-corrected signal. Tube 30'I is a modification of the tube shown in FIG. 3 only in that the collector screen 52' is electrically separate from the final accelerating electrode 50 as shown.

The system shown in FIG. 7 takes advantage of the fact that a signal taken from the decelerating screen 52 is inverted in polarity. The reason for this is that the signal on the signal plate is normally developed by replacing a charge on the photoconductor. Since the electrons returns to the decelerating screen in the areas of the photoconductor which remain charged, this returning beam is of a polarity that is opposite to that derived from the signal plate 56. Thus, the return beam signal that is collected on the decelerating electrode 52 is of polarity that is the opposite of the polarity of the signal derived from the target electrode 56. Thus, no inverter circuit is required.

The inverted signal from the tube 30'I is mixed with the signal from tube 30 in the pre-amplifier 66. This mixing produces a signal that is lag corrected, similar to the curve 28 in FIG. 2, as has been previously explained.

Figures 8, 9, 10, 11:
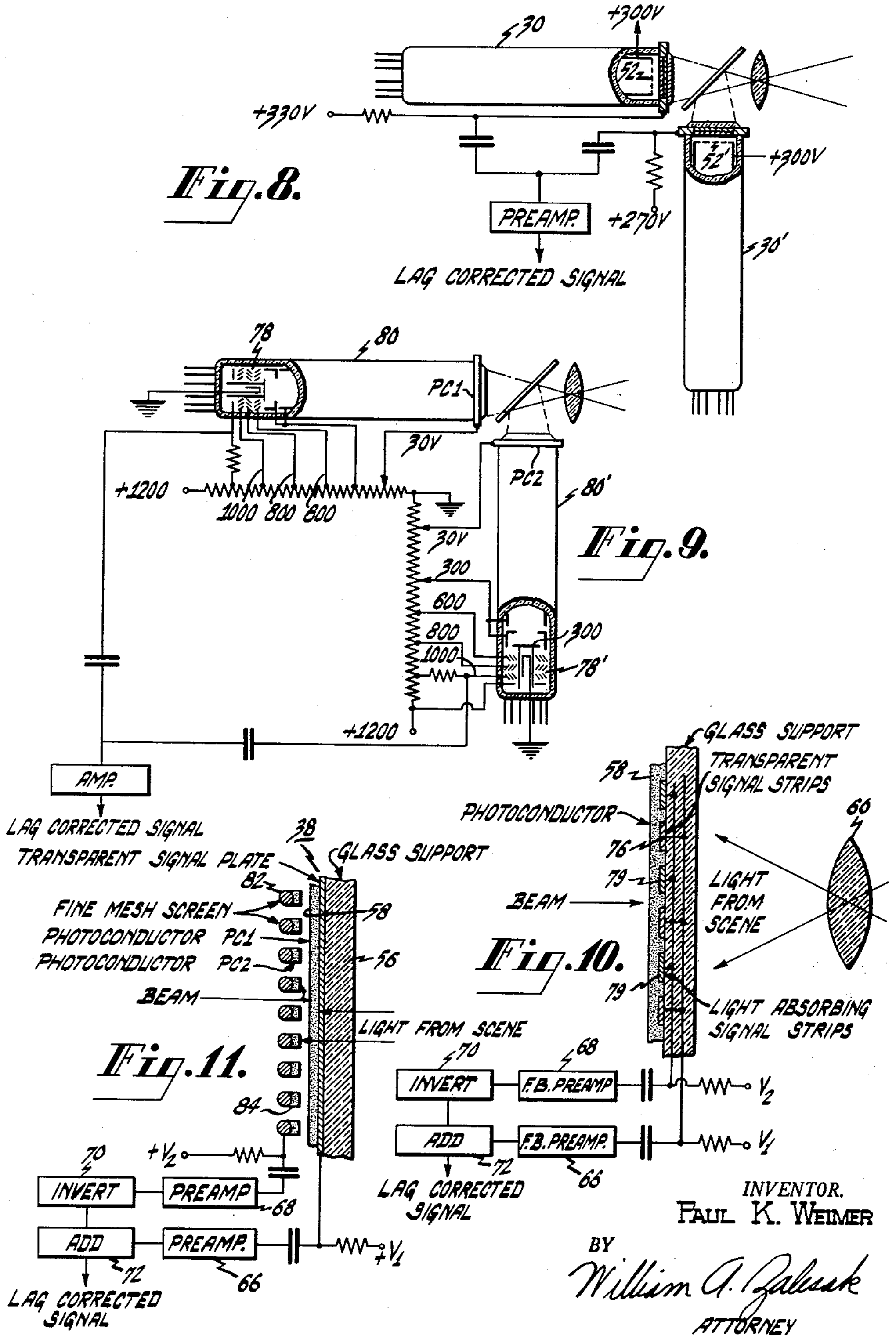
FIGS. 10 through 13 are enlarged fragmentary sectional views of embodiments of targets for use in the tube of the type shown in FIG. 3, in accordance with this invention.

Referring now to FIG. 8, there is shown a diagrammatic view of an embodiment of this invention that also eliminates the requirement of an inverter in the external circuit connections of the tubes. The tubes 30 and 30' are the equivalent of the tube shown in FIG. 3. The inverted signal is obtained in tube 30' by operating the target in tube 30' below the potential of the collector electrode 52', while the target in tube 30 is operated above the potential of the collector electrode 52. Thus, an input light drives the target of tube 30 positive, and that of tube 30' negative, with respect to the respective collector electrodes due to the voltage relationship existing between the signal plates and the collector electrodes. The balance of the system shown in FIG. 8, for producing the lag corrected signal, is similar to that described in connection with FIG. 7.

Referring now to FIG. 9, there is shown a diagrammatic view of a system in accordance with this invention which utilizes two tubes 80 and 80', each of which is the equivalent of the tube shown in FIG. 3 except that a different electron multiplier section 78 and 78', respectively, is used in each of the tubes. Any of the conventional types of electron multipliers may be used, such as the well known pin wheel type of electron multiplier. In tube 80', an inverted polarity signal is obtained by taking the signal from the last multiplier dynode 78', whereas in tube 80 the signal is taken from the conventional output electrode. This produces relative signal inversion due to the fact that the gain in a multiplier dynode stage results in modulated current flow to that dynode of an inverted polarity. The output signals are fed through an amplifier, as has been explained previously, to produce a lag corrected signal.

It should be noted that, in each of the FIGS. 4 through 9, optical and electrical registry should exist between the main and the correcting tubes. Also, in each of these embodiments, some means for producing different transient responses is provided to make the correcting signal more laggy than the main signal.

Referring now to FIG. 10, there is shown an embodiment of this invention that produces the compensating signal and the main signal within a single tube. The tube is similar to that shown in FIG. 3, except for the target structure. The signal plate of FIG. 10, which is similar to signal plate 56 of FIG. 3, comprises a plurality of groups of parallel electrically conducting strips 76 and 79. The alternate strips 76 are transparent and are connected together and to a feedback pre-amplifier 66. The intermediate strips 79 are partially light-absorbing and are connected together and to a feedback pre-amplifier 68. The transparent signal strips 76 may be made of evaporated gold of a thickness that is thin enough to be transparent, e.g. 80 Angstrom units. The semi-transparent conductive signal strips 79 may also be made of gold but of a thickness, e.g. 250 Angstrom units, such that a portion of the light is filtered by these strips. The balance of the tube is substantially the same as that shown in FIG. 3.

During operation of the embodiment shown in FIG. 10, the areas of the photoconductor 58 that are over one of the transparent signal strips 76 produce the main signal. The areas of the photoconductor 58 that are over the semi-transparent, or partially light absorbing, signal strips 78 produce the compensating signal. The compensating signal has a transient response that is different from that of the main signal due to the fact that the partially light absorbing signal strips 79 produce a filtering action on the light from the scene to be reproduced.

The output of the target shown in FIG. 10 is fed into a circuit as shown which is substantially the equivalent of the circuit shown in FIG. 4, and which has been previously described, to produce the lag corrected signal. The pre-amplifiers in FIG. 10 may be of the feedback type, however, in order to provide the low impedance that is desired to obtain independent signals from the target in the presence of the high interstrip capacity.

Referring now to FIG. 11, there is shown another embodiment of this invention for producing a lag corrected signal within a single tube. This tube differs from the tube shown in FIG. 3 only in that a fine mesh screen 82, having a photoconductor 84 thereon, is provided adjacent to the target 38. The photoconductor 84 is on the light input side of the screen 82. In this embodiment, the main signal is obtained from the action of the photoconductor 58 on the signal plate 56 as has been explained. The compensating signal is obtained from the action of the photoconductor 84 on the fine mesh screen 82 which functions as a signal output electrode.

During operation of the embodiment shown in FIG. 11, light from the scene to be reproduced is directed onto the faceplate which decreases the resistance of the photoconductor 58 and the resistance of the photoconductor 84. Due to the thickness of the photoconductor 58, a portion of the light from the scene is absorbed by the photoconductor 58 before it reaches the photoconductor 84. Thus, only a portion of the light from the scene strikes the photoconductor 84 resulting in a signal on the fine mesh screen 82 that is more laggy than the signal on the signal plate 56. As is indicated in FIG. 11, the electron beam scans the photoconductor 58 and is reflected to scan the compensating photoconductor 84.

The circuit connections for the embodiment shown in FIG. 11 are substantially the equivalent to those shown for the two tubes of FIG. 4, except that both the main and the compensating signal are obtained from one tube, and further description of the circuit is not deemed necessary.

Figure 12:
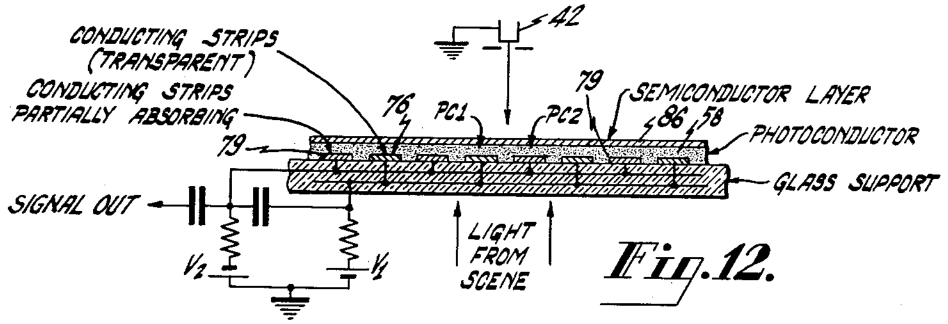

Referring now to FIG. 12, there is shown a partial sectional view of a target for a single camera tube embodiment of this invention for producing a lag corrected signal. This embodiment comprises a target for use in a tube of the type shown in FIG. 3. The target is similar to that shown in FIG. 10 except that a layer of semiconductive material 86 is provided on the photoconductive layer 58. The signal plate comprises alternate light transparent electrically conductive signal strips 76 and intermediate partially light absorbing electrically conducting signal strips 79 as in the structure shown in FIG. 10.

During operation, the light transparent conducting signal strips 76 are connected together and are connected to the positive side of a source of potential $V_1$. The main signal is developed in the areas of the photoconductor 58 that are over the transparent conducting signal strips 76. The partially light absorbing conductive signal strips 79 are connected together and to the negative side of a source of potential $V_2$. The lag correcting signal is developed in the areas of the photoconductor that are over the partially light absorbing signal strips 79. Due to the fact that the partially light absorbing signal strips 79 have a negative, with respect to the cathode 42, potential applied thereto, the electron beam will not land on the target in the areas over the partially light-absorbing signal strips 79. Therefore, in order to provide a complete circuit, a leakage path is provided between the areas where the electron beam lands on the target and the areas of the target where the electron beam does not land. The semi-conducting layer 86 provides this leakage path. The semiconductive layer 86 should be a thin layer having a surface leakage of approximately $10^{14}$ ohms per square, such as would be provided by a layer 0.1 of a micron thick, of a material, e.g. evaporated germanium slightly oxidized, having a volume resistivity of approximately $10^9$ ohm centimeters. The optimum value of surface leakage of the semi-conducting layer depends upon the size of the target, the number of strips, and the resolution required.

The areas of the photoconductor that are over the partially light absorbing signal strips 79 provide a more laggy signal due to the light filtering action of the signal strips 79 as has been previously explained. The output is connected as shown in FIG. 12. Alternatively, the lag corrected signal may be taken from the portion of the beam returning to an electron multiplier at the gun as has been explained.

Figure 13:
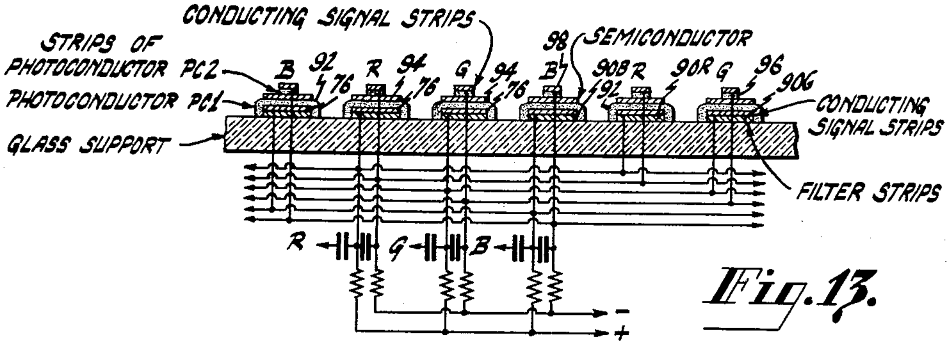

Referring now to FIG. 13, there is shown an embodiment of this invention for producing a single tube, tricolor, lag corrected signal. The target in FIG. 13 is designed to be used in a tube of the type shown in FIG. 3. The target comprises a group of color sensitive elements each of which includes a color filter 90R, 90B and 90G. The color filters each pass one of three selected primary colors and may be in shape of filter strips. On each of the color filters 90R, 90B and 90G there is a different transparent signal strip 76. The signal strips 76 are covered by a strip of photoconductive material 92. On top of the photoconductive strips 92 is a layer of semiconductive material 94 that may be in strip form or in the form of isolated tabs. On top of the semi-conductor 94 is provided a small area of photoconductive material 96 which functions as the lag correcting photoconductor when used in connection with signal strips 98 that are arranged thereon. The color filters 90R, 90B and 90G may be of any conventional type such as interference filters.

During operation of the target shown in FIG. 13, light from the scene to be reproduced is filtered by the different color filters 90R, 90B and 90G to excite the main photoconductors 92. This light is further filtered by passing through the photoconductor 92 and the semi-conductors 94 to strike the lag correcting photoconductors 96. Thus, the lag correcting photoconductors 96 have a different transient response than the main photoconductors 92 due to the light filtering action of the main photoconductors 92 and the semi-conductors 94.

Due to the fact that a negative potential is applied to the conducting signal strips 98, as shown, the beam will not land on these signal strips to form a complete circuit. Therefore, the return path for these areas is provided by means of the semi-conducting tabs or strips 94 which are similar in materials and in operation to the semi-conducting layer 86 described in connection with FIG. 12.

The signal obtained from the signal strips 98 is inverted, due to the negative potential applied thereto, and is more laggy, due to the light filtering action described. For lag compensated operation, the signal from the compensating signal strips 98 for one color is mixed with the main signal from the signal strips 76 for that color. Thus, the circuitry for operation of this embodiment includes an amplifier for each of the three primary colors. However, the circuitry does not require an inverter.

Figure 14:
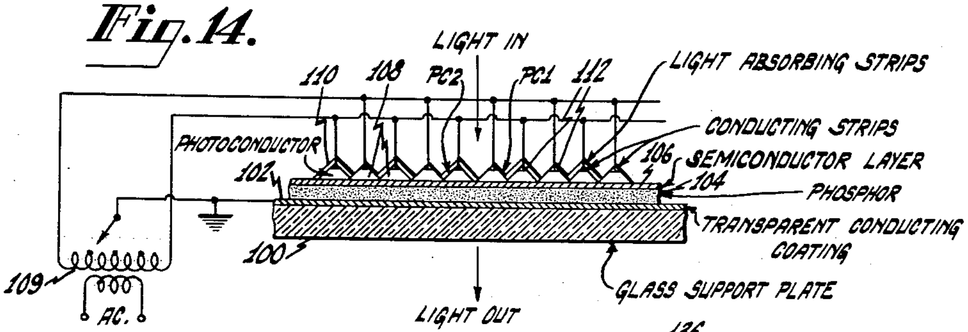
FIG. 14 is an enlarged fragmentary sectional view of a light amplifier structure in accordance with this invention.

Referring now to FIG. 14, there is shown a sectional view of an embodiment of this invention as applied to an electroluminescent panel. The electroluminescent panel comprises a glass support plate 100 having a continuous transparent conductive coating 102, which may be a material such as tin chloride or thin gold, on one surface thereof. On the transparent conductive coating 102 there is provided an electroluminescent phosphor 104 which may be of a material such as a manganese-activated zinc sulphide. On the electroluminescent phosphor 104 there is provided a semi-conducting layer 106 which may be of a material such as a conducting form of cadmium sulphide. On the semi-conducting layer 106 there is provided a grooved photoconductive member 108 which may be a material such as a photoconductive form of cadmium sulphide powder imbedded in a plastic. Each of the protruding portions of the photoconductor 108 has a different conducting strip 112 thereon. The conducting strips 112 may be of a material such as air-drying silver paste approximately one mil thick that may be applied with a spray gun. As indicated schematically, the alternate conducting strips 112 are connected together and to one side of an alternating current source 109, while the intermediate conducting strips 112 are connected together and to the other side of the source 109. The alternate protruding parts of the photoconductor 108 are each covered with a different partially light absorbing strip 110. The partially light absorbing strips 110 may be of a material such as a resin containing a small amount of lampblack applied by means of a spray gun.

During operation of the electroluminescent device shown in FIG. 14, light is directed into the device as shown in the drawing. The strips of the photoconductor 108 that are exposed directly to the input light decrease in resistance by the action of the light and therefore a potential is developed across the electroluminescent phosphor 104 in these areas. In the areas of the photoconductor 108 which are beneath a partially light absorbing strip 110, the photoconductor 108 is more laggy due to the smaller amount in light striking these areas as has previously been explained. A complete electrical path through the electroluminescent panel shown in FIG. 14 comprises the path from one of the conducting strips 112 through the panel to the transparent conducting coating 102 and back to an adjacent conducting strip 112. Thus, a bridge type electroluminescent panel is described wherein one leg of the bridge provides a more laggy signal than the other leg of the bridge. The circuit connections shown for the electroluminescent panel are the equivalent of the circuit shown in FIG. 1, except that an alternating current supply is used. Proper selection of the lag in each of the arms of the bridge provides a lag corrected composite signal by balancing the signal from a conducting strip 112 that is directly exposed to the light with the signal from a conducting strip 112 that is beneath a partially light absorbing strip 110.

Figures 15, 16:
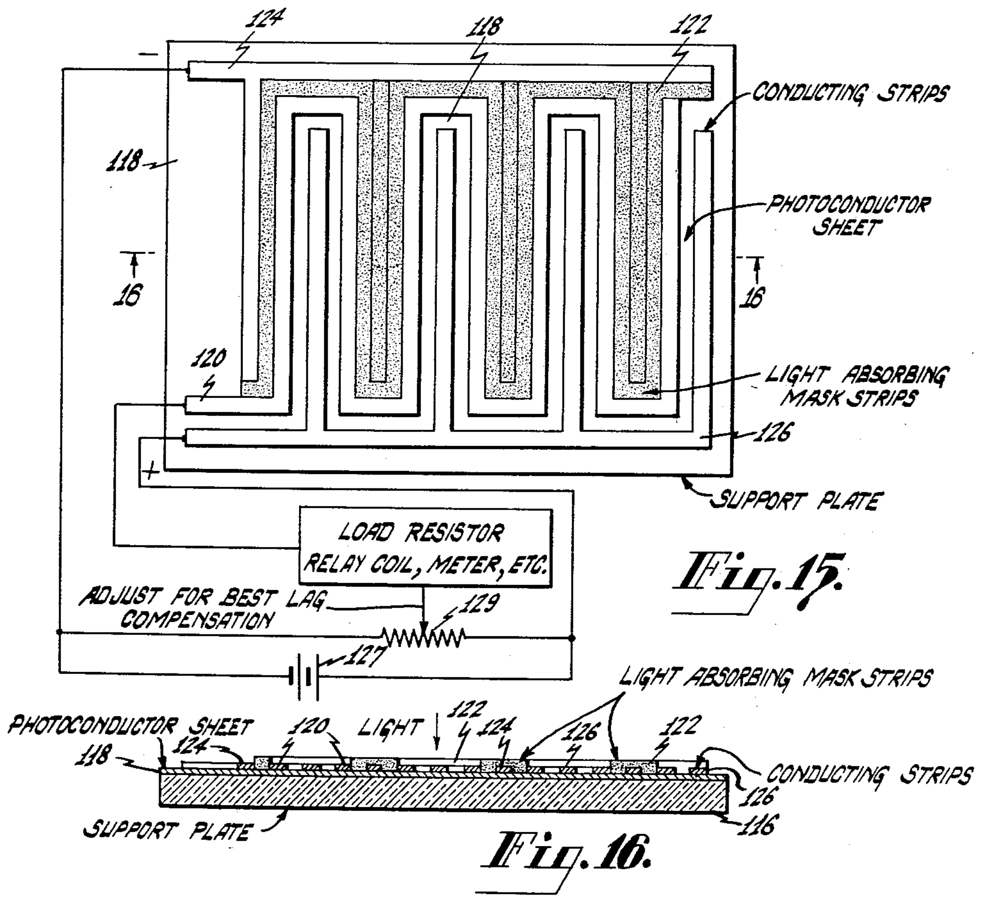
FIGS. 15 and 16 are a plan and a sectional view, respectively, of a photoconductive cell in accordance with this invention.

Referring now to FIGS. 15 and 16, there is shown a plan and sectional view, respectively, of a photocell that produces a lag corrected composite signal in accordance with this invention. The photocell comprises a support plate 116 which may be of a material such as glass. On one surface of the support plate 116, there is provided a continuous sheet of photoconductive material 118 which may be of a material such as cadmium selinide or cadmium sulphide. On the photoconductive material 118 there is provided an interdigitated electrode system comprising three sets of transparent conductive strips. One set of transparent conducting strips 126 is connected to the positive side of a source of potential 127. The set of transparent conducting strips 124 is connected to the negative side of the source of potential 127, and the set of transparent conducting strips 120 is connected to a potential, that is between the potential of strips 124 and 126, by means of a variable resistor 129. The set of transparent signal strips 124 is partially shielded from the light by a light absorbing mask 122.

During operation, light is directed onto the photocell as shown and strikes the photoconductor directly in the space between the transparent conductive strip 120 and the transparent conductive strip 126. The same light is partially filtered before it strikes the photoconductor 118 in the area between the transparent conducting strip 124 and the transparent conducting strip 120. Thus, the signal produced between the strips 120 and 124 will be more laggy than the signal produced between the strips 120 and 126. The two signals are adjusted, by means of the variable resistance 129, to provide the desired lag corrected composite signal as has previously been explained.

Figure 17:
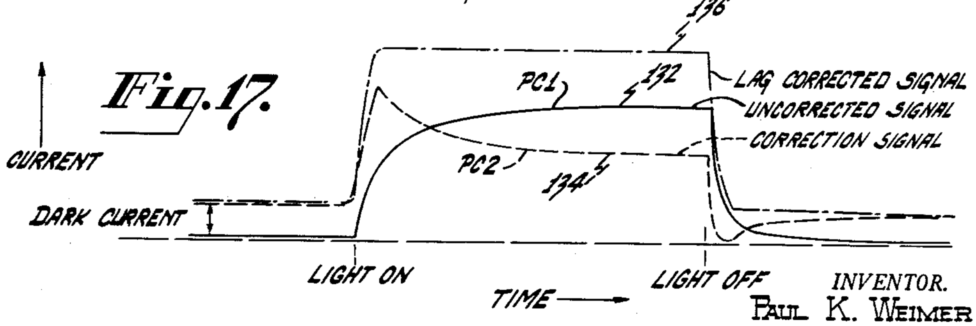
FIG. 17 is an output voltage curve illustrating the benefits obtained by using the addition method of combining output voltages, in accordance with this invention.

FIG. 17 shows an output voltage characteristic illustrating the benefits obtained by using the addition method of combining output signal voltages in accordance with this invention. The addition method of lag compensation has the advantage that none of the signal is lost when combining the two signals. As shown in FIG. 17, the curve 132 represents the signal from the main photoconductor PC1 while the curve 134 represents the signal from the compensating photoconductor PC2. It should be noted that the low level signal from the compensating photoconductor PC2 has an initial rapid rise in which the current overshoots but then decreases to a stable value with the light on. When the light is turned off, the current in the compensating photoconductor drops rapidly to a value that is less than the steady state dark current and then rises slowly to the steady dark current value. The slow component of the transient response in the compensating photoconductor is equal and opposite to the slow transient response in the main photoconductor PC1. A photoconductor which is known to exhibit the type of response illustrated by curve 134 is, as an example, a thick evaporated layer of amorphous selenium. Thus, when the compensating signal is added to the main signal, the slow components are cancelled out and the resultant signal consists only of the fast component of the main signal from the tube 30. The curve 136 represents the lag corrected combination, by addition, of these two signals. When using the addition method of producing lag compensation, a fairly large dark current is produced, as is illustrated by the curves shown. However, this dark current can easily be eliminated from the lag corrected signal by means of a clipping type of amplifier in the circuit connections.

From a system standpoint, photocells, pickup tubes, or electroluminescent panels may utilized the benefits obtained by the addition method of lag compensation of this invention by connecting two of these devices in parallel, while maintaining electrical and optical registry between the main and the lag correcting device. In the addition method of lag compensation, the light from the scene strikes both the main photoconductor PC1 and the compensating photoconductor PC2 substantially simultaneously.

Figure 18:
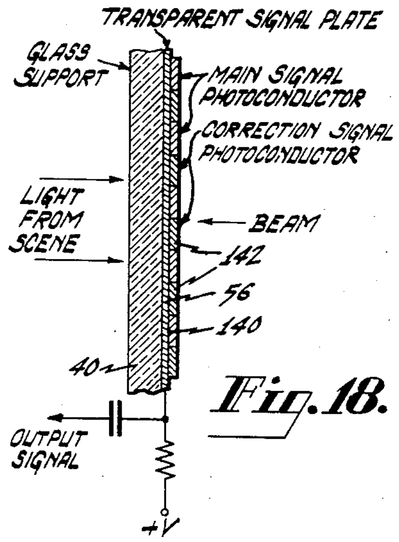
FIGS. 18 and 19 are sectional views of pickup tube targets, for use in a tube of the type shown in FIG. 3, to obtain the output voltage characteristic shown in FIG. 17, in accordance with this invention.

Referring now to FIG. 18, there is shown a partial sectional view of a target for single, monochrome pickup tube embodying this invention for producing a lag-corrected signal by the addition process. The target of FIG. 18 is used in a tube of the type shown in FIG. 3. The target comprises a transparent signal plate 56 supported upon a transparent faceplate 40. The only difference between the target in FIG. 18 and that shown in FIG. 3 is that the photoconductor is divided into alternating parallel strips of different photoconductive materials rather than being a continuous layer. The alternate strips of photoconductive material 140 produce the main signal, as represented by curve 132 of FIG. 17. The alternate strips 140 of photoconductive material may be of a material such as antimony tri-sulphide. The intermediate strips 142 of photoconductive material are selected to produce the overshoot type of signal as is illustrated by curve 134 of FIG. 17. The intermediate strips 142 of photoconductive material may be of a material such as amorphous selenium.

In operation of the device shown in FIG. 18, the light from the scene to be reproduced simultaneously strikes both the main signal photoconductor 140 and the compensating signal photoconductor 142. When the beam scans the areas of the target that are of reduced resistance due to the effect of the light, the beam "sees" photoconductive material having two different transient response curves, i.e. different lag characteristics, and adds these two lag characteristics together to produce a composite lag corrected signal similar to curve 136 in FIG. 17.

Figure 19:
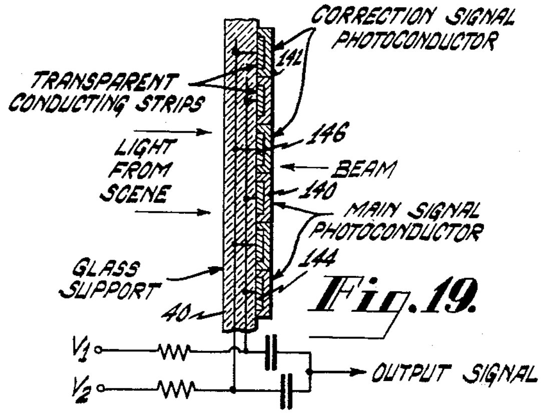

Referring now to FIG. 19, there is shown an embodiment of this invention for use as a target structure in the pickup tube of FIG. 3 and for producing a lag compensated signal by the process of addition. The target shown in FIG. 19 is similar to that shown in FIG. 18 except that the signal plate is divided into a plurality of parallel strips 144 and 146. The strips 144 and 146 are beneath strips of photoconductive material that have different transient response characteristics as has previously been described in connection with FIG. 17. The purpose of providing the separate sets of signal strips 144 and 146 is that, in FIG. 19, the signal strips can be biased to different potentials for convenience in obtaining the optimum balance between the correcting signal and the main signal. During operation of the target shown in FIG. 19, the output signal may be obtained from a return beam or from a single pre-amplifier connected to the target.

Although only two structures have been illustrated to describe the addition method of lag compensation of this invention, it should be understood that many of the structures used for subtraction can also be used for addition. As an example, the structure shown in FIG. 13 could be used for the addition method of lag compensation by applying a positive potential to signal strips 96 and by connecting the signal strips 96 in parallel with the signal strips 76 for the particular primary color.

It is realized that for both the addition and the subtraction method of lag compensation, the optimum degree of lag compensation may not be obtained at all light levels. However, experience has shown that if the two signals are adjusted for optimum compensation at an intermediate or high level, the lag characteristic for a low light signal, while less than optimum, will be adequate and in all cases is better than that of an uncompensated signal.

In both the subtraction and the addition systems and structures of lag compensation, the input light strikes the lag compensating photoconductor and the main photoconductor simultaneously. Also, in both the addition and subtraction systems and tubes for lag compensation, some means is provided to produce a transient response in the main photoconductor PC1 that is different from the transient response in the correcting photoconductor PC2. In both the subtraction and the addition systems and devices for producing a lag compensated signal in accordance with this invention, the output signal of the composite structure has a more correct transient response than either of the signals when considered alone.

What is claimed is:

1. A photoconductive system including photoconductive means, said photoconductive means including a main portion and a lag compensating portion, means for providing a transient response in said lag compensating portion that is different from the transient response in said main portion, said portions being substantially in optical registry whereby said portions are exposed to light from substantially the same elemental areas of an image whereby electrical signals are produced in both of said portions in response to said elemental areas of said image, and means for electrically combining said signals so that the combined signal for each elemental area is lag corrected.

2. A photoconductive system comprising a first area of photoconductor and a second area of photoconductor, said areas being adapted to be electrically energized, said areas also being adapted to be exposed to substantially the same image, whereby electrical signals are produced in both of said areas in response to said image, one of said areas having a transient response that is different from the transient response of the other of said areas, said photoconductive areas being in optical registry, means for combining said electrical signals so that a composite signal is produced having a transient response that is better than the transient response of either of said areas, said means for combining said electrical signals including means for inverting the polarity of one of said signals, and means for adding the inverted signal to the other of said signals.

3. A photoconductive system as in claim 2 wherein said first area of photoconductor and said second area of photoconductor are both enclosed within a single evacuated envelope.

4. A photoconductive system as in claim 2 wherein said first area of photoconductor is enclosed within one evacuated envelope, and said second area of photoconductor is enclosed within another evacuated envelope.

5. A photoconductive system as in claim 2 further including means for making both said first and said second areas of photoconductor responsive to light of one selected color.

6. A photoconductive image pickup tube system comprising at least two pickup tubes, each of said tubes including different corresponding elemental areas of photoconductor, both of said areas of photoconductor being arranged so that light from the same elemental areas of a scene strikes both of said tubes substantially simultaneously for producing electrical signals in each of said tubes corresponding to the light from said elemental areas, means for combining said signals from said corresponding elemental areas of photoconductor so that the combined signal from each of said elemental areas of photoconductor is a lag corrected signal as compared to either of the individual signals from said tubes.

7. A photoconductive image pickup tube system comprising at least two pickup tubes, each of said tubes including a different area of photoconductor, said tubes being arranged so that light from an image strikes each of said areas of photoconductor for producing an electrical signal in each of said tubes, means for inverting the polarity of one of said signals, and means for adding said inverted signal to the other of said signals.

8. A photoconductive tube comprising an evacuated envelope, photoconductive means within said envelope, said photoconductive means including at least two areas of photoconductive material, each of said areas being adapted to be struck by light from substantially the same portion of a scene for producing an electrical signal on each of said photoconductive areas, means for inverting the polarity of the signal on one of said photoconductive areas, and means for adding said inverted signal to the signal from the other of said photoconductive areas so that the combined signal is a lag corrected signal.

9. A photoconductive device comprising a photoconductive means, said means being supported upon a first and a second conductor, means for developing a first signal from said photoconductive means that is on said first conductor, means for developing a second signal from said photoconductive means that is on said second conductor, means for inverting the polarity of said first signal, and means for combining said second signal with said inverted signal so that the combined signal is a lag corrected signal.

10. A pickup tube circuit comprising a pair of photoconductive pickup tubes, circuit means for obtaining output signals from each of said tubes, means for varying the transient response, of one of said signals, circuit means for amplifying said signals, circuit means for inverting the polarity of one of said signals, and circuit means for adding said inverted signal to the other of said signals.

11. A photoconductive device comprising a first area of photoconductive material, a second area of photoconductive material, said areas being substantially in optical registry, both of said photoconductive areas being adapted to have light directed thereupon from the same elemental areas of a scene to produce electrical signals in both of said photoconductive areas corresponding to the light from each of said elemental areas of said scene, means including at least one of said photoconductive materials for producing a transient response in said first photoconductive area that is different from the transient response in said second photoconductive area, and means for electrically adding the signal on said first photoconductive area produced by light from each of said elemental areas of said scene with the signal on said second photoconductive area produced by light from each corresponding elemental area of said scene whereby a lag corrected composite signal from each elemental area of light from said scene is produced.

12. The method of operating a photoconductive device of the type including two pluralities of elemental areas of photoconductive material, said method comprising the steps of producing a transient response in one of said pluralities of elemental areas of photoconductive material that is different from the transient response in the other of said pluralities of elemental areas of photoconductive material, simultaneously developing signals corresponding to light from elemental areas of an image on both of said pluralities of elemental areas of photoconductive material, inverting the signal developed from one of said pluralities of areas, and adding said inverted signal to the signal developed in the other of said pluralities of areas of photoconductive material to provide a lag corrected signal.

13. The method of operating a photoconductive device as claimed in claim 12 wherein said one of said pluralities of elemental areas of photoconductive material is positioned in one envelope, and said other of said pluralities of elemental areas of photoconductive material is positioned in another envelope.

14. A target for a television pickup tube comprising a transparent support member, a plurality of conducting strips on said support member, a photoconductor on said conducting strips, the intermediate of said strips being connected together and being substantially light transparent whereby the photoconductor portion above said intermediate strips has a first transient response, the alternate of said strips being connected together and being partially light absorbing whereby the photoconductor portion above said alternate strips has a different transient response, a semiconductor on said photoconductor, the photoconductor above said alternate strips being substantially in optical registry with the photoconductor above said intermediate strips whereby said photoconductor portions are exposed to light from substantially the same elemental areas of an image and electrical signals are produced in both of said photoconductor portions in response to light from said elemental areas of said image, said strips being adapted to have a potential of one polarity applied to said intermediate strips and a potential of the opposite polarity applied to said alternate strips, and means for electrically combining the signals obtained from said photoconductor portions above said intermediate strips with the signals obtained from said photoconductor portions above said alternate strips whereby the combined signal is lag corrected.

15. A photoconductive system as in claim 1 further including an electroluminescent phosphor positioned adjacent to said photoconductive means.

16. A photoconductive system including photoconductive means, said photoconductive means including a main portion positioned in a first pickup tube and a lag compensating portion positioned in a second pickup tube, both of said pickup tubes including an electron multiplier, means for providing a transient response in said lag compensating portion that is different from the transient response in said main portion, said portions being substantially in optical registry whereby said portions are exposed to light from substantially the same elemental areas of an image whereby electrical signals are produced in both of said portions in response to light from said elemental areas of said image, means for obtaining output signals from one stage of the electron multiplier in said first pickup tube, means for obtaining output signals from a different stage of the electron multiplier in said second pickup tube, and means for electrically combining said output signals so that the combined signal for each elemental area is lag corrected.

17. A photoconductive system including photoconductive means, said photoconductive means including a main portion comprising a plurality of strips of a first photoconductor and a lag compensating portion comprising a plurality of strips of a second photoconductor, said lag compensating portion having a transient response that is different from the transient response in said main portion, said portions being substantially in optical registry whereby said portions are exposed to light from substantially the same elemental areas of an image whereby electrical signals are produced in both of said portions in response to light from said elemental areas of said image, and means for electrically combining said signals so that the combined signal for each elemental area is lag corrected.

References Cited in the file of this patent

UNITED STATES PATENTS

| | | |
|---|---|---|
| 2,134,851 | Blumlein | Nov. 1, 1938 |
| 2,482,980 | Kallmann | Sept. 27, 1949 |
| 2,706,791 | Jacobs et al. | Apr. 19, 1955 |
| 2,706,792 | Jacobs | Apr. 19, 1955 |
| 2,749,501 | Bartlett | June 5, 1956 |
| 2,777,970 | Weimer | Jan. 15, 1957 |
| 2,818,548 | Kazan | Dec. 31, 1957 |
| 2,927,501 | Busignies et al. | Mar. 8, 1960 |